United States Patent
Wu et al.

(10) Patent No.: US 7,988,472 B2
(45) Date of Patent: Aug. 2, 2011

(54) ELECTRONIC DEVICE

(75) Inventors: Wei Wu, Shenzhen (CN); Xin Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 72 days.

(21) Appl. No.: 12/647,430

(22) Filed: Dec. 25, 2009

(65) Prior Publication Data

US 2011/0124211 A1 May 26, 2011

(30) Foreign Application Priority Data

Nov. 24, 2009 (CN) .......................... 2009 1 0310335

(51) Int. Cl.
*H01R 13/62* (2006.01)

(52) U.S. Cl. ....................................................... 439/159

(58) Field of Classification Search .................. 439/159, 439/153
See application file for complete search history.

(56) References Cited

U.S. PATENT DOCUMENTS 6,712,627 B2 * 3/2004 Murnaghan et al. .......... 439/159
7,125,271 B2 * 10/2006 Hanzawa et al. ............. 439/159

* cited by examiner

*Primary Examiner* — Xuong M Chung Trans
(74) *Attorney, Agent, or Firm* — Frank R. Niranjan

(57) ABSTRACT

An electronic device comprises a main body comprising an inner surface and a sidewall defining a first through hole. A connector receives an electronic card, and comprising a support portion fixed to the inner surface of the main body. An axle is rotatably connected to the support portion. Two ends of each of the two torsion springs are fixed to the axle and the support portion respectively. A salver is located below the axle, and is slidably connected to the support portion. The salver comprises a spring tab for limiting the electronic card to slide. A groove member is located on the salver, and is connected to the support portion. The groove member comprises a main body and two extending portions. The main body limits the salver to slide. A resuming device is set inside of the main body.

10 Claims, 4 Drawing Sheets

ELECTRONIC DEVICE

TECHNICAL FIELD

The present disclosure relates to an electronic device.

DESCRIPTION OF RELATED ART

Generally, the electronic device such as MP3, mobile device includes a connector for receiving an electronic card, such as, SD card, SIM card etc.

When rejecting or inserting the electronic card, users must slide out a back cover of the electronic device to make the connector exposed, so as to reject or insert the electronic card. However, a long slide makes a touching surface between the electronic device and the back cover smooth, as a result, the back cover can easily get disengaged from the electronic device, and the connector is easily exposed to the electronic device.

Therefore, what is need is an electronic device which can overcome shortcoming described above.

DETAILED DESCRIPTION

Figure 1:
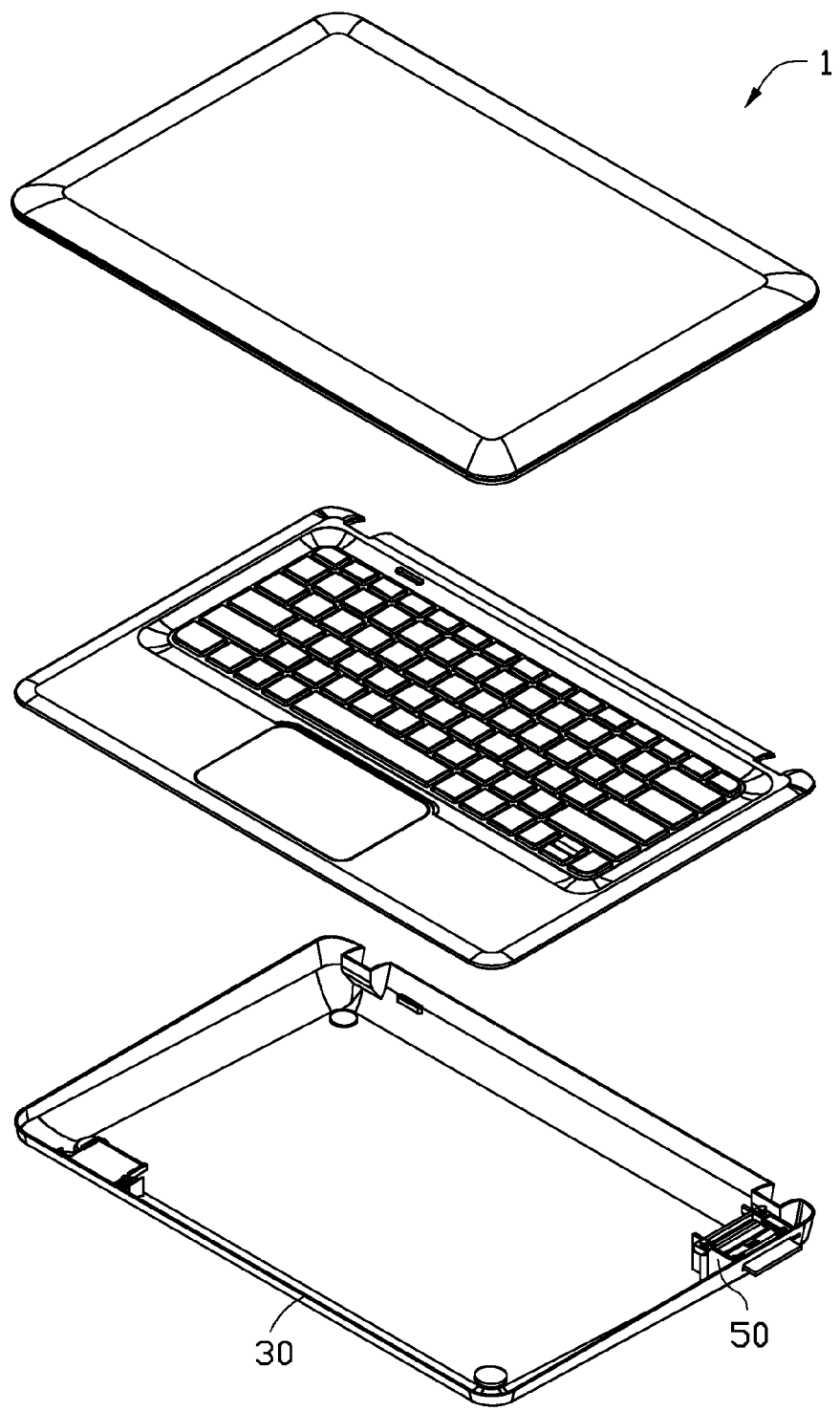
FIG. 1 is an exploded view of an electronic device in accordance with an exemplary embodiment.
Figure 2:
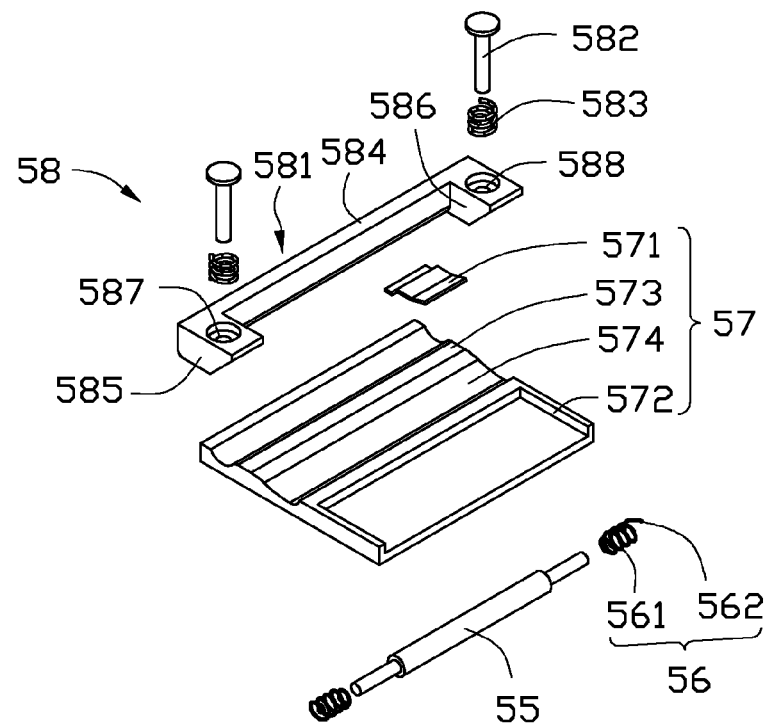
FIG. 2 is an exploded view of a connector of the electronic device of FIG. 1.
Figure 2:
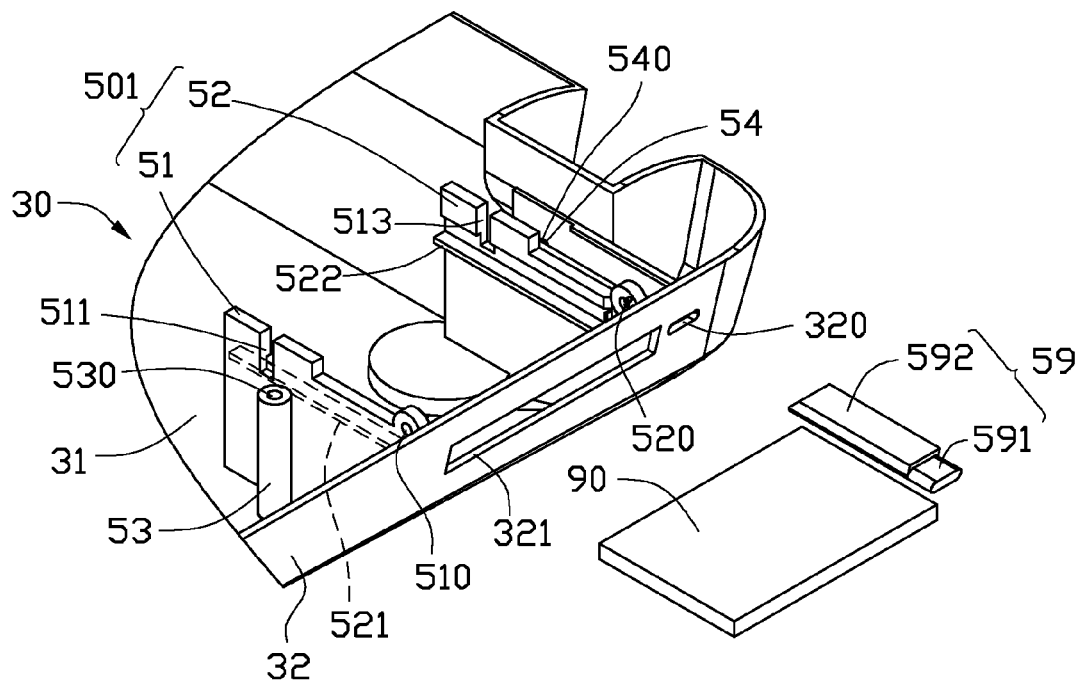

Referring to FIGS. 1-2, an electronic device 1 is provided. In the exemplary embodiment, the electronic device 1 is a notebook computer. The electronic device 1 includes a main body 30 and a connector 50 set inside of the main body 30.

The main body 30 includes an inner surface 31 and a sidewall 32. A second through hole 320 and a first through hole 321 are defined in the sidewall 32. In the exemplary embodiment, the first through hole 321 is configured for inserting the electronic card, such as, SD card. In another embodiment, the electronic device 1 may be The connector 50 is set in the inner surface 31 of the main body 30, and is configured for receiving the electronic card 90. The connector 50 includes a support portion 501, a left positioning pole 53, a right positioning pole 54, an axle 55, two torsion springs 56, a salver 57, a groove member 58, and a resuming device 59.

The axle 55 is rotatably connected to the support portion 501 of the connector 50. The axle direction is parallel to the inner surface 31 of the main body 30. The torsion springs 56 are placed over two ends of the axle 55 respectively. Two ends of the torsion spring 56 are fixed to the axle 55 and the support portion 501 respectively.

The salver 57 is slidably connected to the support portion 501 of the connector 50, and includes a spring tab 571 and a plurality of touching terminal (not shown). The spring tab 571 is set in the top surface of the salver 57, and is configured for pressing the inserted electronic card 90 to keep the electronic card 90 fixed. The plurality of the touching terminals is configured for touching metal terminals (not shown) of the electronic card 90 to establish an electronic connection. The groove member 58 is connected to the support portion 501, and is configured for limiting the salver 57 to slide. The resuming device 59 is set in the inner of the connector 50, and includes a key portion 591 and a main body 592. A portion of the key portion 591 is exposed to the second through hole 320. In the exemplary embodiment, the distance between the top surface of the salver 57 and the below edge of the axle 55 is equal to the thickness of the electronic card 90.

When inserting the electronic card 90, user inserts the electronic card 90 to the salver 57 to a predetermined position by the first through hole 321. When the electronic card 90 is completely inserted into the salver 57, the spring tab 571 presses the electronic card 90 to keep the electronic card 90 fixed. During inserting the electronic card 90 into the salver 57, the electronic card 90 drives the axle 55 to rotate, so that, the torsion spring 55 generates an elastic force relative to the electronic card 90.

When rejecting the electronic card 90, user presses the key portion 591 of the resuming device 59, so that, the resuming device 59 moves in a first direction, and when the resuming device 591 moves in a predetermined position and touches the groove member 58, the groove member 58 starts to move in a second direction by a force from the resuming device 59. When the salver 57 separates from the groove member 58, the limitation of the salver 57 is released, so that, the axle 55 starts to rotate by the elastic force from the torsion spring 56. Simultaneously, due to a friction between the electronic card 90 and the top surface of the salver 57, the axle 55 drives the salver 57 together with the electronic card 90 to move towards to the first through hole 321 until the portion of the electronic card 90 is exposed to the first through hole 321. For better understanding the disclosure, the following is a detailed exemplary embodiment.

The support portion 501 includes a left sidewall 51 and a right sidewall 52. Sliding grooves 521, 522 along a transverse direction are formed in the middle portion of the left sidewall 51 and the right sidewall 52 respectively. The sliding grooves 521, 522 are configured for providing a slideway for the salver 57. In the exemplary embodiment, the distance between the side of the sliding groove 521 and the side of the sliding groove 522 is equal to the length of the first through hole 321.

Axle holes 510, 520 are formed in one end of the left sidewall 51 and the right sidewall 52 adjacent to the sidewall 32 respectively. The axle 55 is passed through the axle holes 510, 520 to rotatably connect to the left sidewall 51 and the right sidewall 52. Peristomes 511, 521 are formed in another end of the left sidewall 51 and the right sidewall 52 away from the sidewall 32 respectively.

Receiving holes 530, 540 along a longitudinal direction are defined in the top surface of the left positioning pole 53 and the right positioning pole 54 respectively.

The groove member 58 includes a positioning block 581, a bolt 582, and a spring 583. The positioning block 581 includes a main body 584 and extending portions 585, 586 extending from the same side of two ends of the main body 584. The extending portions 585, 586 cooperate with the inner surface 31 to form two inclined surfaces respectively. Through holes 587, 888 along a longitudinal direction are defined in the extending portions 585, 586.

The salver 57 includes a front portion 572 and a posterior portion 573. A plurality of grooves 574 is formed on the top surface of the posterior portion 573. The extending direction of the grooves 574 is vertical to the left sidewall 51 and the right sidewall 52.

Each of the torsion springs 56 includes an elastic body 561 and an elastic pole 562. The elastic body 561 is placed over the two ends of the axle 55 respectively. One end of the elastic pole 562 is fixed to the axle 55, and another end of the elastic pole 562 is fixed to the left sidewall 51 and the right sidewall 52.

When assembling the electronic device 1, the salver 57 is placed on the sliding grooves 521, 522, so that, the salver 57 is slidably connected to the left sidewall 51 and the right sidewall 52. Secondly, the elastic body 561 of each of the torsion springs 56 is placed over the two ends of the axle 55, and the two ends of the axle 55 are inserted into the axle hole 510, 520, and the elastic poles 562 of each of the torsion springs 56 are fixed to the axle 55 and the left sidewall 51 and the right sidewall 52 respectively, so that, the axle 55 is rotatably connected to the left sidewall 51 and the right sidewall 52. Thirdly, the resuming device 59 is installed inside of the connector 50, and the key portion 591 is exposed to the second through hole 320. Fourthly, the main body 584 of the positioning block 581 of the groove member 58 is placed on the peristomes 511, 521 of the left sidewall 51 and the right sidewall 52, and the through holes 587, 588 are symmetrical to the receiving holes 530, 540 respectively, so that, the groove member 58 is fixed to the left sidewall 51 and the right sidewall 52. Because the main body 584 presses the groove 574 of the salver 57, thereby limiting the salver 57 to slide.

Figure 3:
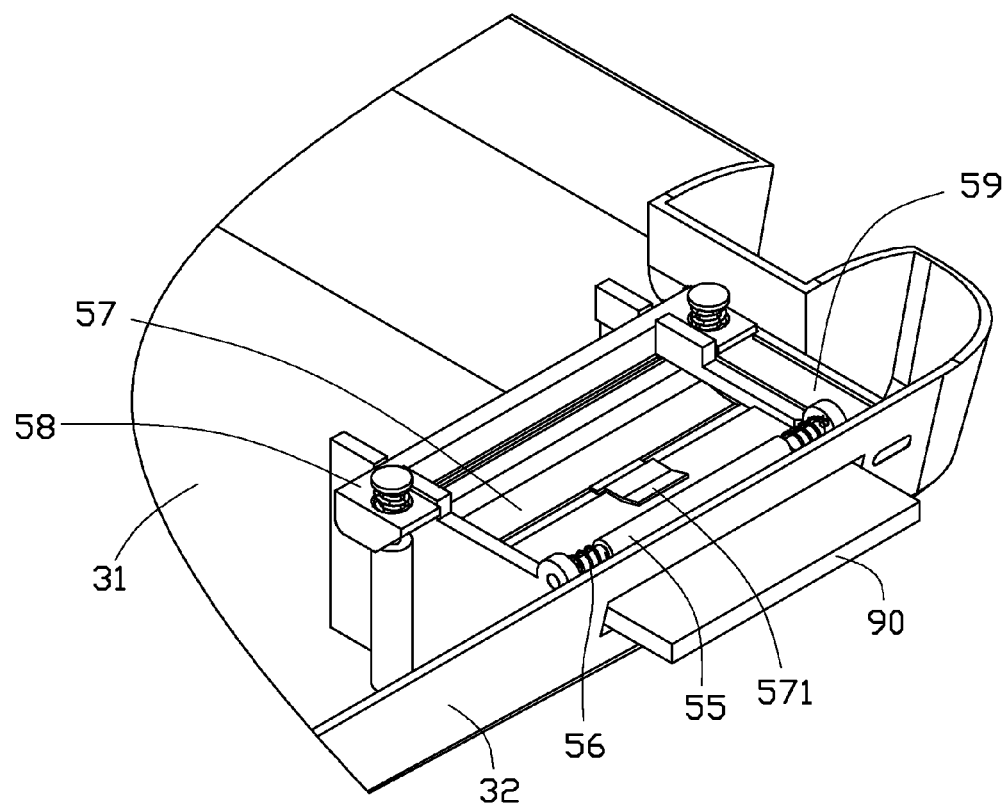
FIG. 3 is a portion sectional view when the electronic card is inserted into the connector.
Figure 4:
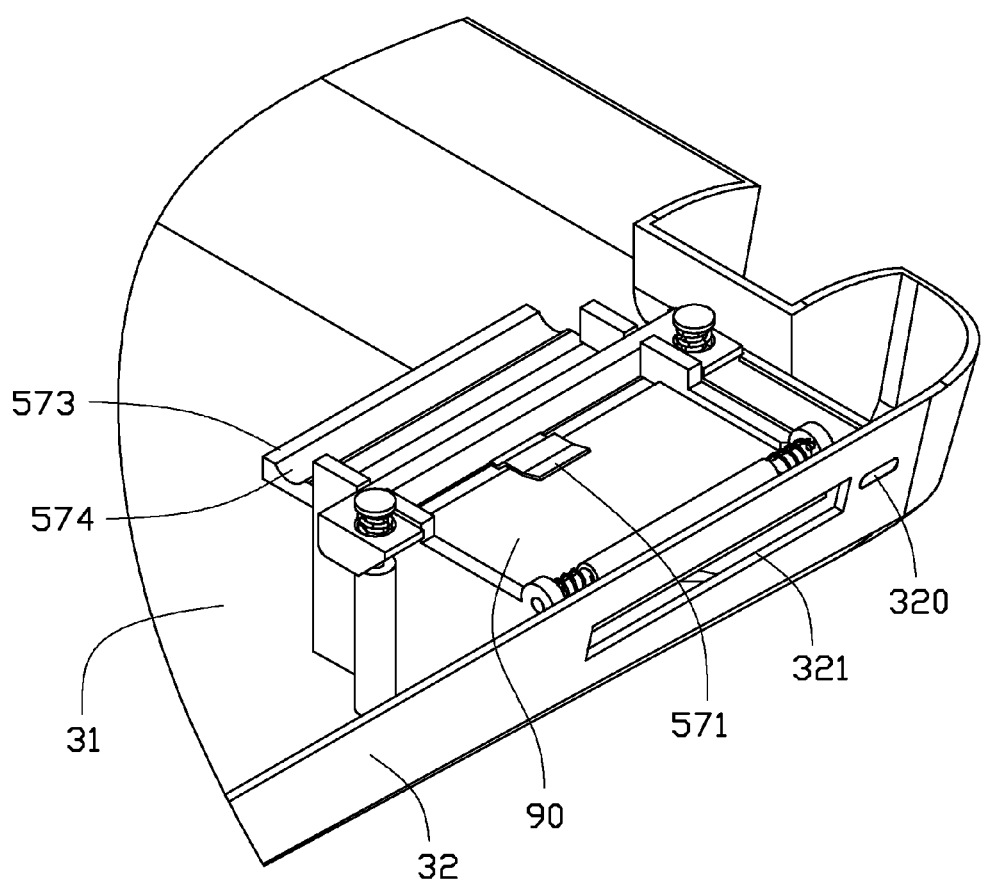
FIG. 4 is a portion sectional view when the electronic card is completely inserted into the connector.

Referring to FIGS. 3-4, when inserting the electronic card 90, user inserts the electronic card 90 into the salver 57 to a predetermined position by the first through hole 321. When the electronic card 90 is completely inserted the salver 57, the spring tab 571 presses the inserted electronic card 90 to keep the electronic card 90 fixed. During inserting the electronic card 90 into the salver 57, the electronic card 90 drives the axle 55 to rotate, so that, the two torsion springs 55 generates an elastic force relative to the electronic card 90.

When rejecting the electronic card 90, user presses the key portion 591 of the resuming device 59, so that, the resuming device 59 moves in a first direction, and when the resuming device 591 moves in a predetermined position, and touches the groove member 58, the groove member 58 starts to move in a second direction by a force from the resuming device 59. When salver 57 separates from the groove member 58, the limitation of the salver 57 is released, so that, the axle 55 starts to rotate by the elastic force from the two torsion springs 56. Simultaneously, due to a friction between the electronic card 90 and the top surface of the salver 57, the axle 55 drives the salver 57 together with the electronic card 90 to move towards to the first through hole 321 until the portion of the electronic card 90 is exposed to the first through hole 321.

After rejecting the electronic card 90, the spring 583 of the groove member 58 resumes elasticity, and drives the groove member 58 to move along a direction adjacent to the groove 574, the inclined surface of the groove member 58 cooperates with the main body 592 of the resuming device 59 to drive the resuming device 59 to move along an axle direction of the first through hole 320 until the resuming device 59 resumes an initial position.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising:
   a main body comprising an inner surface and a sidewall defining a first through hole;
   a connector configured for receiving an electronic card, and comprising:
   a support portion fixed to the inner surface of the main body;
   an axle rotatably connected to the support portion;
   two torsion springs and two ends of each of the two torsion springs fixed to the axle and the support portion respectively;
   a salver located below the axle, and slidably connected to the support portion, and the salver comprising a spring tab configured for limiting the electronic card to slide, wherein during inserting the electronic card, the electronic card drives the axle to rotate to make the two torsion springs to generate an elastic force relative to the electronic card;
   a groove member located on the salver, and connected to the support portion, and the groove member comprising a main body and two extending portions, and the main body configured for limiting the salver to slide;
   a resuming device set inside of the main body, wherein the resuming device moves along a first direction by a force, and when the resuming device moves to a predetermined position and touches the two extending portions, the two extending portions move along a second direction by a force from the resuming device, when the salver separates from the main body, the limitation of the salver is released, and the axle is rotated by the elastic force from the two torsion springs, and drives the salver together with the electronic card to move towards to the first through hole.

2. The electronic device as described in claim 1, wherein the support portion comprises a left sidewall and a right sidewall, the left sidewall and the right sidewall are fixed on the inner surface of the main body, and sliding grooves along a transverse direction are formed in the middle portion of the left sidewall and the right sidewall respectively, and the salver is slidably connected to the left sidewall and the right sidewall by the sliding grooves.

3. The electronic device as described in claim 2, wherein axle holes are defined in one end of the left sidewall and the right sidewall adjacent to the sidewall of the main body respectively.

4. The electronic device as described in claim 3, wherein the connector comprises a left positioning pole and a right positioning pole, receiving holes along a longitudinal direction are defined in the top surface of the left positioning pole and the right positioning pole respectively, and the groove member comprises a positioning block, a bolt, and a spring, the positioning block comprises a main body and extending portions extending from the same side of two ends of the main body, through holes along a longitudinal direction are defined in the extending portions respectively, and the bolt is passed through the spring, the through holes, and the receiving holes in turn, thereby connecting the groove member to the left sidewall and the right sidewall.

5. The electronic device as described in claim 4, wherein the salver comprises a front portion and a posterior portion, a plurality of grooves are formed on the top surface of the posterior portion, peristomes are formed in another end of the left sidewall and the right sidewall away from the sidewall respectively; and the main body of the groove member is located in the peristomes to press the groove for limiting the salver to slide.

6. The electronic device as described in claim 5, wherein a second through hole is defined in the sidewall, and the resuming device comprises a key portion and a main body, the main body is set inside of the connector, and the key portion is exposed to the second through hole.

7. The electronic device as described in claim 5, wherein the extending portions cooperate with the inner surface to form two inclined surfaces.

8. The electronic device as described in claim 2, wherein each of the two torsion springs comprises an elastic body and an elastic pole, the elastic body is placed over two ends of the axle, and one end of the elastic pole is fixed to the axle, and another end of the elastic pole is fixed to the left sidewall and the right sidewall respectively.

9. The electronic device as described in claim 2, wherein the distance between the side of the two sliding grooves is equal to the length of the first through hole.

10. The electronic device as described in claim 5, wherein the distance between the top surface of the salver and the below edge of the axle is equal to the thickness of the electronic card.

* * * * *